(12) United States Patent
Lieven et al.

(10) Patent No.: US 8,840,063 B2
(45) Date of Patent: Sep. 23, 2014

(54) FRONT STRUCTURE OF AN AIRCRAFT FUSELAGE COMPRISING LANDING GEAR

(71) Applicant: Airbus Operations (SAS), Toulouse (FR)

(72) Inventors: Patrick Lieven, Fronton (FR); Pascal Chaumel, Plaisance du Touch (FR)

(73) Assignee: Airbus Operations SAS, Toulouse (FR)

( * ) Notice: Subject to any disclaimer, the term of this patent is extended or adjusted under 35 U.S.C. 154(b) by 12 days.

(21) Appl. No.: 13/689,324

(22) Filed: Nov. 29, 2012

(65) Prior Publication Data

US 2013/0134259 A1    May 30, 2013

(30) Foreign Application Priority Data

Nov. 30, 2011 (FR) ...................... 11 60987

(51) Int. Cl.
*B64C 25/10* (2006.01)
(52) U.S. Cl.
USPC ................................... 244/102 A; 244/102 R
(58) Field of Classification Search
USPC .......................................... 244/102 A, 102 R
See application file for complete search history.

(56) References Cited

U.S. PATENT DOCUMENTS

| | | | | |
|---|---|---|---|---|
| 2,826,381 A * | 3/1958 | Cruz | ...................... | 244/102 SL |
| 4,228,975 A * | 10/1980 | Sealey | ...................... | 244/102 R |
| 5,897,078 A | 4/1999 | Burnham | | |
| 6,213,428 B1 * | 4/2001 | Chaumel et al. | .............. | 244/119 |
| 6,666,407 B2 * | 12/2003 | Pancotti | ..................... | 244/102 R |
| 6,824,100 B1 * | 11/2004 | Cheetham | .................. | 244/102 R |
| 8,453,965 B2 * | 6/2013 | Amberg | ..................... | 244/102 A |
| 2009/0078822 A1 | 3/2009 | Wood | | |
| 2010/0032521 A1 | 2/2010 | De Ruffray et al. | | |
| 2012/0112000 A1 * | 5/2012 | Moine | ........................ | 244/102 A |
| 2012/0168562 A1 * | 7/2012 | Alonzo et al. | ............ | 244/102 A |

FOREIGN PATENT DOCUMENTS

| | | |
|---|---|---|
| GB | 458187 | 12/1936 |
| WO | 2007057400 | 5/2007 |

OTHER PUBLICATIONS

French Search Report, Jul. 26, 2012.

* cited by examiner

*Primary Examiner* — Christopher P Ellis
(74) *Attorney, Agent, or Firm* — Greer, Burns & Crain Ltd.

(57) ABSTRACT

A front structure of an aircraft fuselage comprising landing gear pivoting about a main shaft and a stay shaft. The front structure also comprises a first reinforcing frame and a second reinforcing frame, the main shaft and the stay shaft being respectively connected to the first and second frames, and a device for the mechanical connection and transfer of forces connecting the stay shaft and the main shaft and transferring to the main shaft a portion of the forces induced by the wheels of the landing gear onto the stay shaft, the second frame and said device being perpendicular to one another.

14 Claims, 6 Drawing Sheets

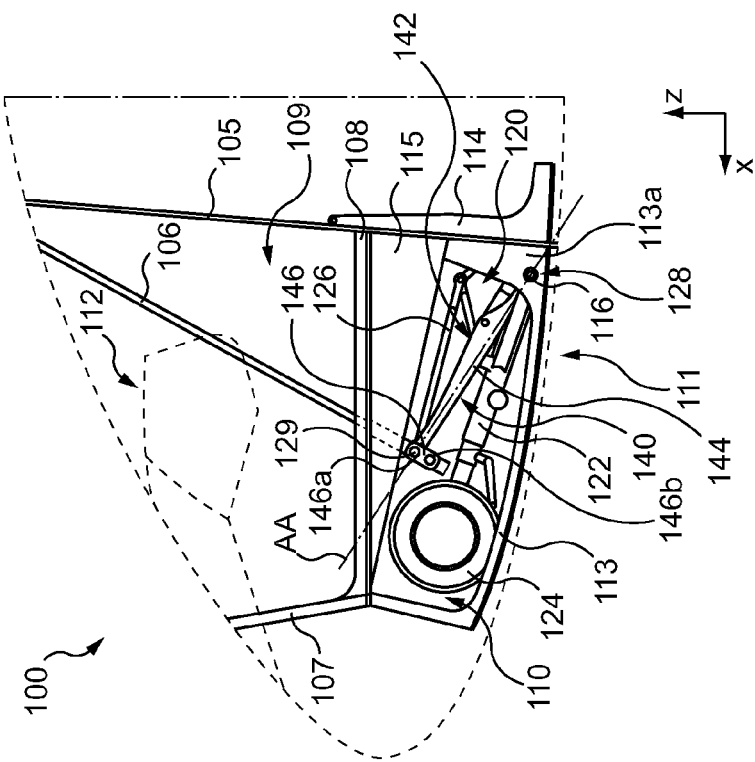

FRONT STRUCTURE OF AN AIRCRAFT FUSELAGE COMPRISING LANDING GEAR

BACKGROUND OF THE INVENTION

The invention relates to a front structure of an aircraft fuselage comprising landing gear.

Usually the front landing gear on an aircraft is housed in a gear housing situated inside the front structure of the fuselage. This housing performs a dual function depending on whether the aircraft is in flight or on the ground.

During flight, the housing isolates the gear from the aerodynamic flows so as to increase the performance of the aircraft.

On the ground, its role is to transmit the forces induced by the landing gear to the reinforcing elements of the front structure, in particular its frames.

Currently, the elements that form the landing gear are connected to the frames of the front structure by means of the elements of the landing-gear housing.

FIG. 1 illustrates a portion of an aircraft fuselage 1 of the prior art, more particularly a conventional aircraft front structure 2.

The front structure 2 most frequently consists of frames and an outer skin which are interrupted by apertures designed for the installation of cockpit windows 3.

This structure comprises a landing-gear housing 4, of substantially parallelepipedal shape, comprising a hatch 6, two side walls 8, a ceiling 9, a front wall 10 and a rear wall 12.

The hatch 6, consisting of two substantially rectangular articulated flaps, is situated flush with the front structure 2 and locally closely follows the curvature thereof. In the closed position, it is locally substantially flat.

On either side of this hatch 6 there are two side walls 8 that are substantially flat and parallel with one another which connect the hatch 6 and the ceiling 9 which is substantially flat and has a rectangular surface.

The landing-gear housing 4 is closed at the front (toward the front of the fuselage) by the front wall 10 which extends from the hatch 6 to the ceiling 9 and, at the rear, by the rear wall 12 that is substantially flat and perpendicular to the hatch 6.

A conventional landing gear 20 incorporated into the landing-gear housing 4 is shown in FIG. 2.

Such a gear notably comprises a leg 22 furnished at one end with wheels 24 and, at a distance from this end, a strut 26 taking the form of a Y.

The leg 22 is connected at its end opposite to the wheels 24 to a shaft 28, called the main shaft. This main shaft 28 has the same direction as the pitch axis of the aircraft. The shaft 28 is connected at each of its opposite ends to one of the side walls 8 close to the junction between the rear wall 12 and the hatch 6.

The strut 26, for its part, is connected at its end closest to the wheels (the base of the Y) to the leg 22, and at its other two opposite ends (the branches of the Y) to a shaft 29, called the stay shaft. This stay shaft 29 is parallel with the main shaft 28. It is connected at each of its opposite ends to one of the side walls 8, close to the ceiling 9 and approximately halfway between the front wall 10 and the rear wall 12.

The main shaft 28 and the stay shaft 29 are used to cause the leg 22 and the strut 26 to pivot about the pitch axis of the aircraft so as to move the landing gear 20 from a deployed position such as that of FIG. 2 to a retracted position in which the gear is confined in substantially horizontal position (the horizontal position of the aircraft when it is on the ground) inside the housing 4.

When the aircraft is running on the ground, it is therefore to the bearings of the main shaft 28 and stay shaft 29 that the axial forces coming from the wheels 24 are transmitted.

Since these bearings are connected to the walls 8 of the landing-gear housing 4, it is the walls that transmit the forces induced by the landing gear 20 to the front structure 2.

SUMMARY OF THE INVENTION

The invention proposes to make improvements to the front aircraft structures furnished with landing gear as described above.

Accordingly, the invention relates to a front structure of an aircraft fuselage comprising landing gear capable of pivoting about two parallel pivoting shafts, a main shaft and a stay shaft, in order to allow the deployment or the retraction of the gear, the landing gear comprising a leg supporting wheels that is connected to the main shaft and a strut connecting the leg to the stay shaft, wherein the front structure also comprises:

a first reinforcing frame and a second reinforcing frame, the main shaft and the stay shaft being respectively connected to the first and second frames, a device for the mechanical connection and transfer of forces connecting the stay shaft and the main shaft and transferring to the main shaft a portion of the forces induced by the wheels of the landing gear onto the stay shaft, the second frame and said device being perpendicular to one another.

Such arrangements make it possible to transfer the forces originating from the landing gear (the reaction of the ground against the weight of the airplane, forces associated with the dynamic landing and with running, etc.) through the simplest and shortest possible path to the frames of the front structure of the aircraft.

More precisely, the forces absorbed by the stay shaft are transferred to the main pivoting shaft via the device for transferring forces.

The relative orientation of the device for mechanical connection and transfer of forces relative to the second frame makes it possible to prevent any residual force or any force component that is not oriented in the plane of a frame or in the axis along which the device extends, for example along the longitudinal axis of the fuselage.

Thus, only the reinforced elements of the structure (frames) and the device for transferring forces support and transfer the forces transmitted by the landing gear.

According to one possible feature of the invention, the front structure extends in a longitudinal direction, the first frame extending in a cross section of the front structure and the second frame being inclined relative to this cross section.

Such an inclination of the second frame also makes it possible to prevent this frame from interfering with the complex zone of the cockpit window surrounds of the front structure. It is then no longer necessary to reinforce these surrounds. This second frame can then be made in a continuous manner (for example in the form of a continuous closed ring) and it can also serve as a reliable geometric reference for the assembly of the elements of the front structure.

According to one possible feature, the front structure also comprises a landing-gear housing, a portion of the first frame of the front structure forming a rear wall of the landing-gear housing and the landing-gear housing comprising reinforcing elements resting on the rear wall and extending longitudinally toward the front of the housing following the local internal curvature of the fuselage.

The reinforcing elements replace the complete side walls of larger surface area of the housing of the prior art. The housing according to the invention is therefore lighter.

The side walls are therefore recessed in their central portion so as to leave only a peripheral portion or a border of these walls which runs along the first frame starting from the roof of the housing and which extends toward the front of the latter (L shape), or even then runs up again toward the roof (U shape).

Moreover, the reinforcing elements make it possible to reinforce the first frame, in particular the lower portion of the latter forming a partition between the depressurized zone of the landing housing and the pressurized zone of the hold.

In order to better transmit to the first frame the forces induced by the landing gear on the main shaft, the main shaft is attached to the reinforcing elements of the landing-gear housing at or close to their resting point on the rear wall.

According to one possible feature of the invention, the landing-gear housing comprises a roof having a convexity oriented toward the inside of the landing-gear housing.

The advantage of such an arrangement is to confer increased pressure resistance on the housing roof. The zone of the housing is in fact not pressurized unlike the zones situated above (the cockpit zone) and behind (the hold zone).

According to one possible feature of the invention, the device for mechanical connection and transfer of forces comprises several mechanical connection members extending in an extension direction and connecting the main shaft to the stay shaft.

It will be noted that these members are arranged apart so as to delimit between them a housing for accommodating a portion of the landing gear.

According to a first embodiment, the device for mechanical connection and transfer of forces comprises a rod assembly which comprises at least one connecting rod and at least one clevis.

According to one possible feature of the invention, said at least one connecting rod is connected, at one of its opposite ends, to the main shaft and, at its other end, to the stay shaft, the clevis directly connecting the stay shaft to the second frame of the front structure.

The advantage of such an arrangement is that it makes it easier to incorporate the landing gear because it is connected to the structure only by the main and stay shafts. Notably this makes it possible to limit the adjustments to be made and to insert a preadjusted landing gear in an existing structure.

So as to transfer the forces induced by the landing gear to the frames of the front structure via the simplest possible path, said at least one clevis directly connects the stay shaft to the second frame.

The device for mechanical connection and transfer of forces may be made secure by duplicating its constituent elements. For this, the rod assembly comprises two connecting rods and two clevises associated respectively with the two connecting rods, the connecting rods being parallel with one another.

According to one possible feature of the invention, the landing gear also comprises at least one lifting cylinder placed on said at least one connecting rod of the rod assembly.

This arrangement has the advantage of not having to place the lifting cylinder on the roof of the landing-gear housing as in the prior art.

More particularly, if the device for mechanical connection and transfer of forces comprises two connecting rods and two clevises, the landing gear comprises two lifting cylinders each placed on one of the two connecting rods of the rod assembly.

By virtue of this arrangement, it is possible to distribute the power necessary to rotate the main shaft to two cylinders and not just one, which makes it possible to obtain a space saving amongst other things.

Moreover, the dissymmetrical deformations are limited relative to a configuration with a single cylinder.

In a second embodiment, the mechanical connection members comprise at least two parallel bars directly connecting the first frame of the fuselage to the second frame of the fuselage, the main shaft having two opposite ends connected to the first frame, a first bar being arranged on the side of one of the two opposite ends of the main shaft and a second bar being arranged on the side of the other end of the main shaft, so that the bars, the main shaft and the stay shaft form a parallelogram.

The bars are elements that are both simple to manufacture and resistant to tension forces, thus making them particularly suitable for the transfer of the forces involved.

One advantage of the parallelogram arrangement is that it can deform and thus absorb the forces due to the pressure differences between the landing-gear housing zone and the pressurized zones of the front structure.

In order to add security to the device for mechanical connection and transfer of forces, the mechanical connection members also comprise a third bar and a fourth bar, the third bar being arranged beside the first bar and the fourth bar on the side of the second bar, all the bars being parallel with one another.

Finally the invention relates to an aircraft comprising a front structure as briefly explained above.

BRIEF DESCRIPTION OF THE DRAWINGS

Other features and advantages will appear in the course of the following description given as a nonlimiting example and made with reference to the appended drawings in which:

FIG. 6 is a schematic representation in section of the front structure of FIG. 5;

FIG. 7 is a partial, enlarged schematic representation of the front structure of FIG. 6 in which the landing gear is in the deployed position and which illustrates the forces brought into play when running;

DETAILED DESCRIPTION OF THE PREFERRED EMBODIMENTS

In the following description, the orientations will correspond to those of an aircraft on the ground on flat ground.

Figure 2:
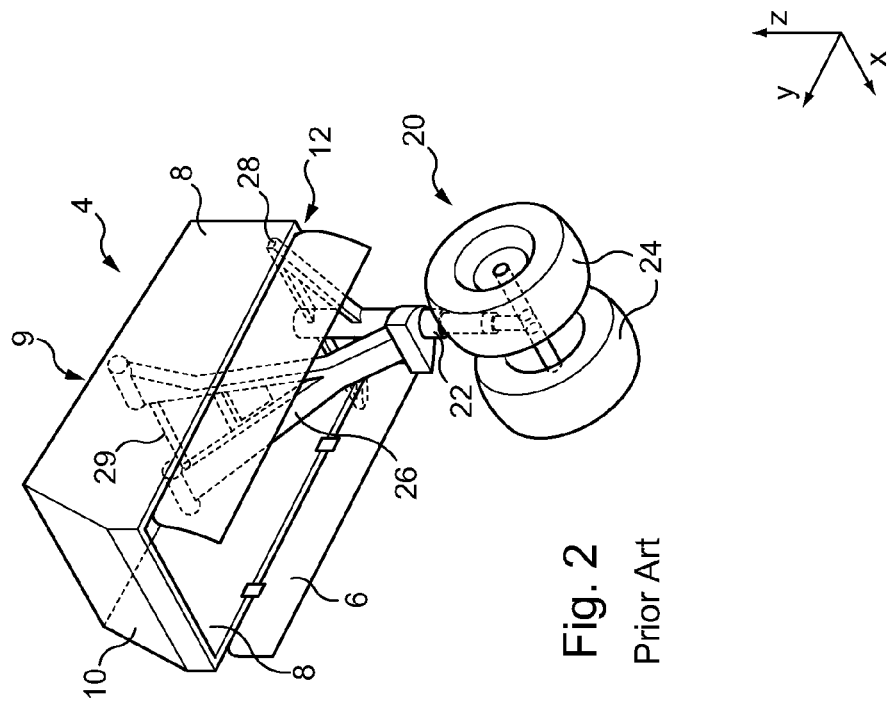
FIG. 2 (prior art) is a schematic representation in perspective of the landing-gear housing of FIG. 1 and of its landing gear.
Figure 1:
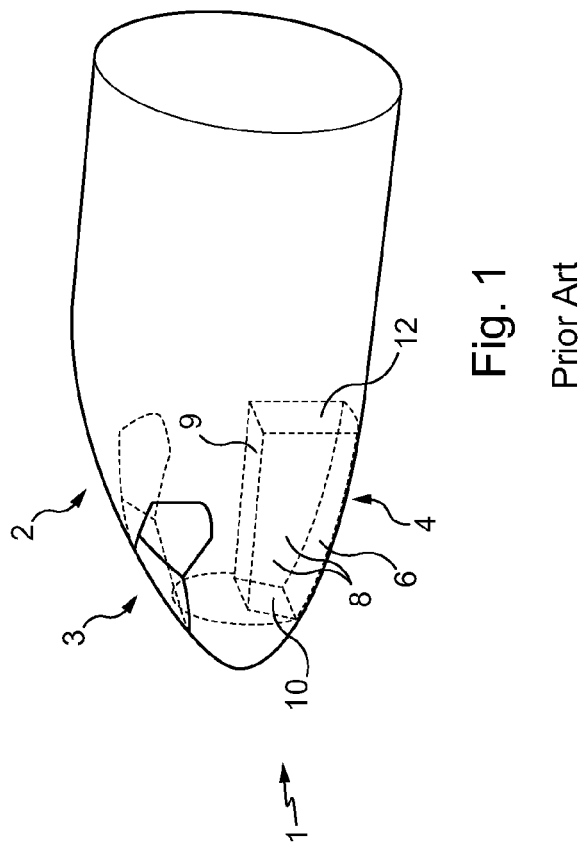
FIG. 1 is a schematic representation in perspective of a front structure of an aircraft furnished with a landing-gear housing according to the prior art.
Figure 3:
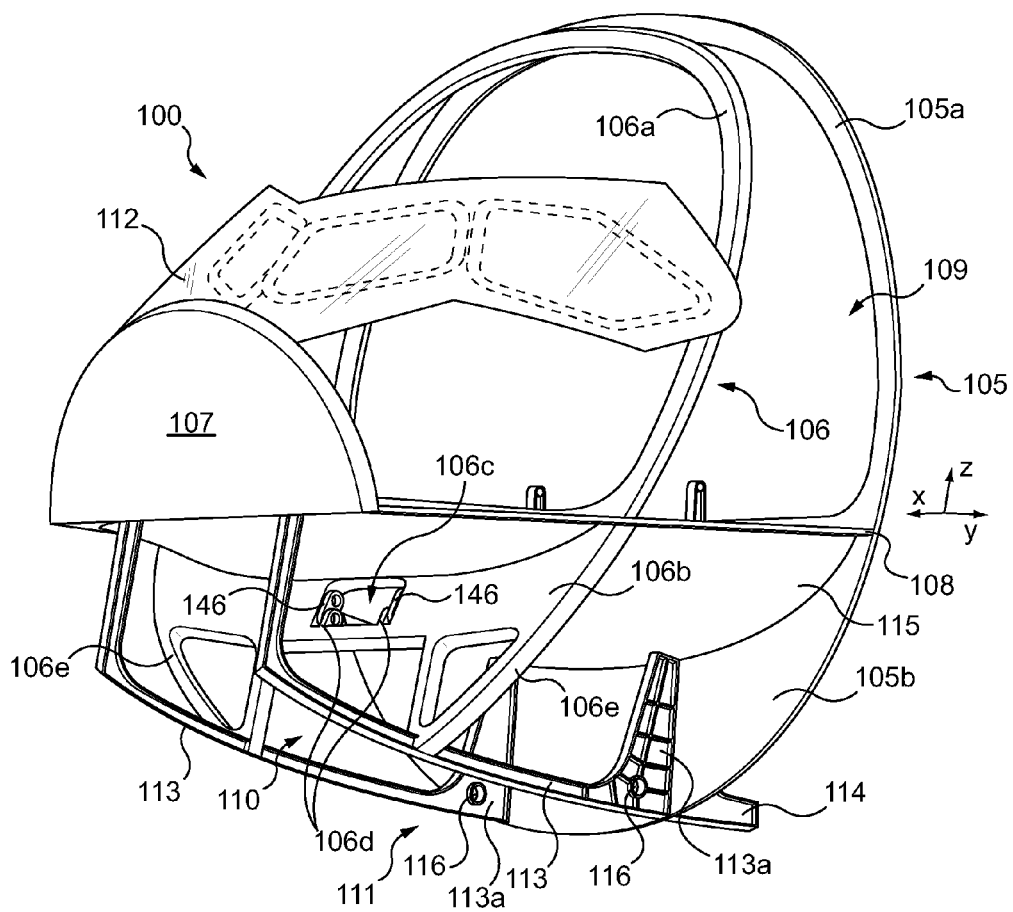
FIG. 3 is a schematic representation in perspective of a portion of the elements of a front structure of an aircraft according to a first embodiment of the invention.

FIG. 3 represents a front structure 100 of an aircraft fuselage in a first embodiment according to the invention. The front structure 100 shows an overall symmetry relative to a plane XZ and comprises a skin (not shown for reasons of clarity in this figure but represented by dashed lines in FIG. 6) which is reinforced by a plurality of frames and walls, including at least a first frame or rear frame 105, a second frame or intermediate frame 106 and a delimiting wall 107 separating the nose of the aircraft (not shown and situated in front of this wall) from the rest of the front structure.

Behind the delimiting wall 107, the fuselage front structure 100 is divided into two compartments by a floor 108. The upper compartment 109 delimits the cockpit and the lower compartment 110 the landing-gear housing 111.

The first frame 105 is perpendicular to the plane XZ, that is to say that it extends in a cross section (the plane YZ) of the aircraft. However, other orientations can be envisaged. It is situated behind the structure 100 and marks the separation between the cockpit and the aircraft cabin, in other words between the front structure and the central portion (not shown) of the aircraft.

The first frame 105 extends over the periphery of the transverse local section of the fuselage.

The first frame 105 comprises an annular portion 105a extending into the upper portion (the pressurized zone) of the periphery of the local section of the fuselage, and of a partition 105b extending into the lower portion of the periphery of the local section of the fuselage. The partition 105b marks the separation between the landing-gear housing 111 and the hold situated in the central portion of the aircraft. Since these two zones are not subjected to the same pressure, the partition 105b is a solid portion of the frame, also called a partition wall, and is preferably reinforced.

The second frame 106 is situated in front of the first frame 105 close to the rear of a pane 112 which is arranged on the skin of the fuselage, in the top portion of the upper compartment 109 and close to the delimitation wall 107.

The second frame 106 is notably inclined rearward (an oblique position) so as not to interfere with the pane 112.

In the upper portion (the pressurized zone) the second frame 106 comprises an annular portion 106a (interrupted in the figure for reasons of clarity) extending over the periphery of an oblique local section of the fuselage and, in the lower portion (the unpressurized zone), of a strip 106b.

The strip 106b is a solid portion of the frame, also called a partition wall, and is pierced at its center with a substantially rectangular aperture 106c. The aperture 106c is delimited by four internal edges: two side edges, one bottom edge and one top edge.

On the internal bottom edge of the aperture 106c, two shaft supports 106d are arranged situated close to the side edges of the aperture. These shaft supports 106d or bearings extend toward the top of the second frame 106 and are designed to allow the attachment and the articulation of the landing gear as will be seen below.

In the bottom portion, the second frame 106 is comprised of two hoops 106e extending the annular portion 106a so as to closely follow the shape of the lower portion of the fuselage.

These hoops 106e are substantially V-shaped, each of the branches of the two Vs being connected to the strip 106b.

However, the second frame 106 may also be extended in its bottom portion by an arc of a circle, of the same diameter on the annular portion 106a for example.

The delimitation wall 107 comprises two half-disks extending respectively on the side of the upper compartment 109 and on the side of the lower compartment 110 along different inclinations relative to the plane YZ.

For reasons of clarity, only half of the upper disk is shown. It is slightly inclined toward the nose of the front structure 100 relative to the first frame 105.

As has been seen above, the lower compartment 110 delimits a space reserved for the landing-gear housing 111. The housing 111 is also shown in FIGS. 5, 6 and 7 in interaction with its landing gear shown in detail in FIG. 4. For reasons of clarity, the hoops 106e are not shown in these figures.

This housing 111 notably comprises two parallel reinforcing elements 113 each forming a side frame or hoop and a domed roof or ceiling 115 from which each reinforcing element 112 extends downward. Each reinforcing element 112 comprises a rear brace 113a resting against the partition wall 105b of the rear frame 105. These elements are assembled so as to arrange inside the housing 111a substantially parallelepipedal space that can house a landing gear.

As can be seen in FIG. 3 and in section in FIG. 6, the reinforcing elements 113 are substantially U-shaped, the branches of the U being connected and respectively to the partition wall 105b of the rear frame 105 and to the delimitation wall 107. The base of the U closely follows the longitudinal local profile of the front structure 100.

The branch of the U attached to the rear frame 105 or rear brace 113a is in contact with the partition wall 105b over the whole length of its extension along the axis Z and is attached thereto with the aid of bolts (not shown), in particular shear and/or tension bolts.

The rear brace 113a comprises an axial extension along the axis X so as to make it possible to pierce holes 116 therein in which the two opposite ends of the main shaft of the landing gear will be inserted as will be seen below.

On the other side of the partition wall 105b (the hold side), the attachment of the rear braces 113a is consolidated by the presence of heel pieces 114 which are bracket-shaped pieces of which one of the branches is attached over the whole of its length to the partition wall 105b in the same extension direction (the Z axis) as the rear braces 113a. Like the rear braces 113a, the heel pieces 114 are attached to the partition wall 105b by bolts.

Thus, the portion of the partition wall 105b delimited by the rear braces 113a serves as a rear wall for the landing-gear housing 111.

The domed roof 115 situated just beneath the unreferenced floor, extends along the longitudinal axis X from the partition wall 105b to the delimitation wall 107.

For this, it is in contact, at its rear end, with the partition wall 105b along a contact curve of which the convexity is turned toward the compartment 110 and, at its front end, with the delimitation wall 107 along a contact line parallel to the axis Y. This contact line is located on a diameter of the circle of which the wall 107 forms half.

Thus, the roof 115 is convex on the side of the lower compartment and also passes through the intermediate frame 106 to which it is also attached so as to locally closely follow the upper portion of the strip 106b.

Unlike the landing-gear housings of the prior art, the landing-gear housing 111 does not therefore comprise side walls which would absorb the forces induced by the landing gear but only recessed walls reduced to elements 113 forming their border or periphery.

It will be noted that the particular shape of the reinforcing elements 113 limits the possible geometric discontinuities generated in the shape of the front structure 100.

Moreover, the convex shape of the roof 115 makes it more resistant to the pressure forces which makes it possible to limit possible deformations of the gear housing associated with the pressurization of the zones of the front structure 100 situated close by, such as the upper compartment 109 (the cockpit zone) and the hold (not shown) situated behind the partition wall 105b.

Figure 4:
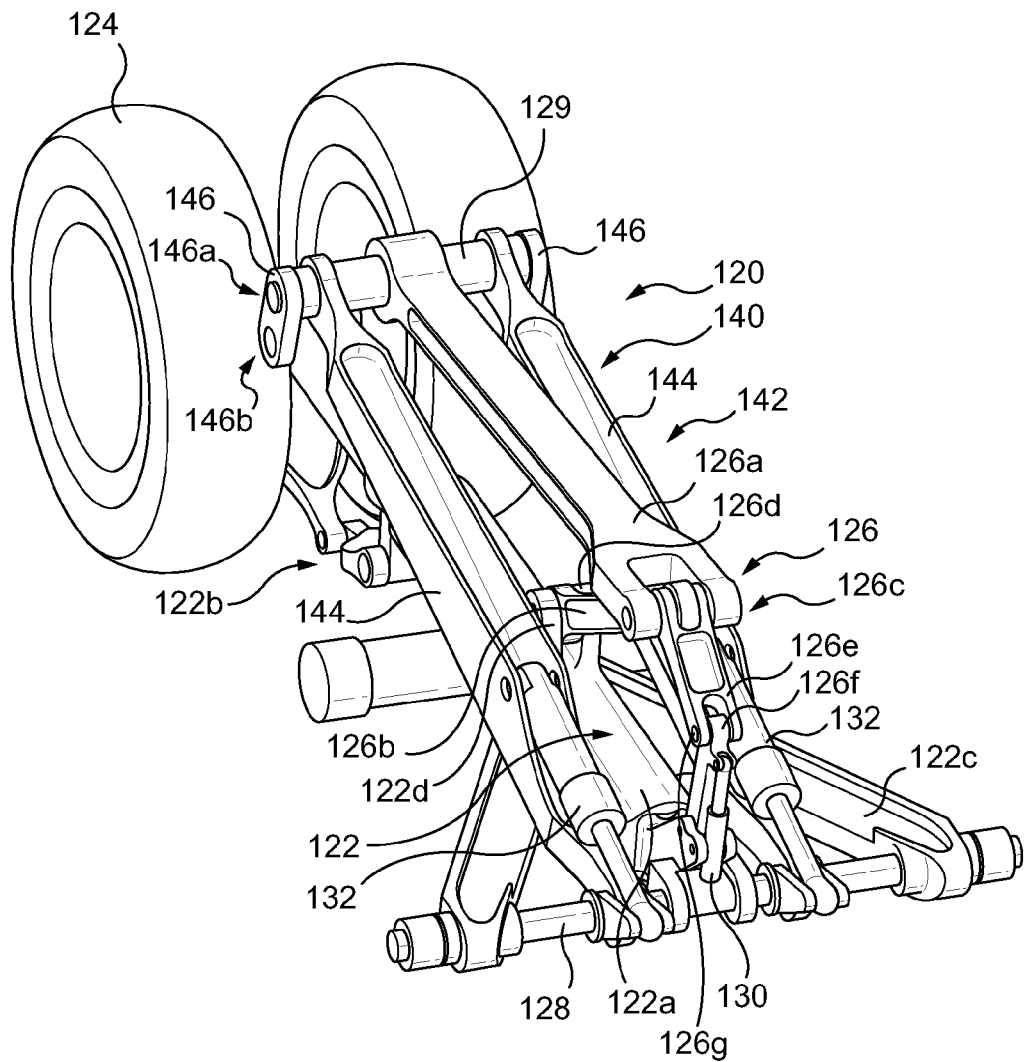
FIG. 4 is a schematic representation of a landing gear and of a device for mechanical connection and transfer of forces in the embodiment of FIG. 3.
Figure 5:
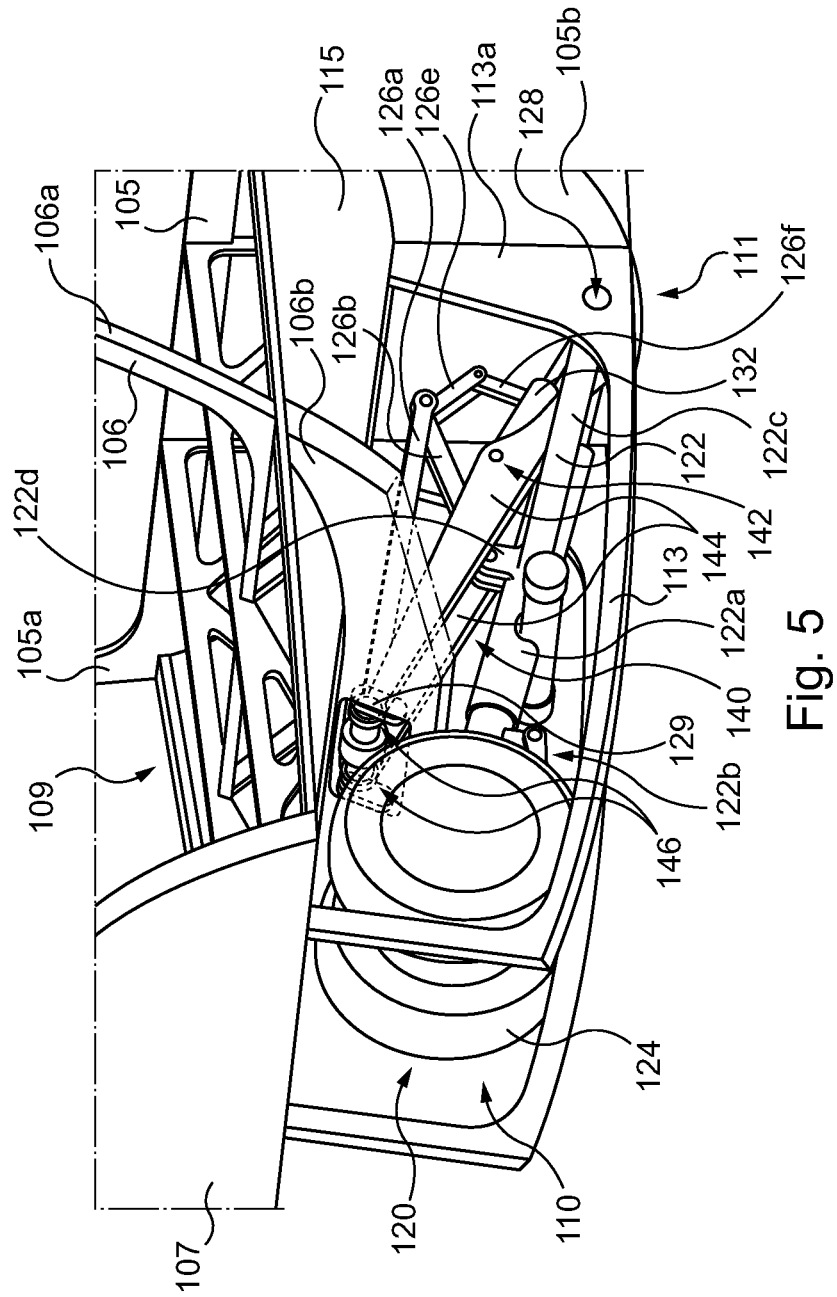
FIG. 5 is a schematic representation in perspective of a detail of the front structure of an aircraft of FIG. 3.

With reference to FIG. 4, the elements of a front landing gear 120 designed to be housed in the landing-gear housing 111, and its incorporation with the elements comprising the front structure 100 will now be described with reference to FIGS. 5, 6 and 7.

The landing gear 120 comprises a leg 122 furnished at one of its two opposite ends with wheels 124, a strut 126, a main shaft 128 and a stay shaft 129.

The leg 122 is connected at its end opposite to the wheels 124 to the main shaft 128. This shaft, once incorporated into the front structure 100, is inserted into the holes 116 of the rear braces 113 of the landing-gear housing 111 and is therefore arranged parallel to the pitch axis of the aircraft, in other words the direction of the axis Y.

The stay shaft 129, once incorporated into the front structure 100, is inserted into the shaft supports 106d of the second frame 106 and is therefore parallel to the pitch axis of the aircraft and to the main shaft 128.

As can be seen in FIG. 4, the leg 122 of the landing gear 120 comprises a branch 122a supporting an articulated strut 122b and a Y-shaped support 122c.

The branch 122a comprises two cylinders of different diameters fitted into one another, the cylinder having the smaller diameter being that which is connected to the wheels 124 at one end of the branch 122a by means of the articulated strut 122b.

The Y-shaped support 122c extends from an intermediate portion of the leg toward the main shaft.

The support 122c has two branches connected to the main shaft 128 close to the opposite ends of the latter and these two branches extend on either side of the opposite end of the branch 122a which is also connected to the main shaft 128.

The leg 122 also comprises, on the branch 122a, a connecting shaft support 122d.

The strut 126 for its part comprises a first strut connecting rod 126a, a second strut connecting rod 126b, an intermediate shaft 126c, a leg shaft 126d, a first strut link rod 126e, a second strut link rod 126f and a second intermediate shaft 126g.

The first and second strut connecting rods 126a, 126b connect on the one hand the strut 126 to the stay shaft 129 and, on the other hand, the strut 126 to the leg 122 (FIGS. 6 and 7).

More precisely, the first strut connecting rod 126a is connected, at one end, to the stay shaft 129 and, at its other end, to the second strut connecting rod 126b via the intermediate shaft 126c (this shaft is parallel with the stay shaft 129) and about which the connecting rods 126a and 126b are both capable of pivoting.

The second strut connecting rod 126b is for its part connected by one end to the first strut connecting rod 126a via the shaft 126c and, by its opposite end to the leg 122 by means of the leg shaft support 122d. The leg shaft 126d, parallel with the intermediate shaft 126c, is inserted into the support 122d. The second strut connecting rod is capable of pivoting about the leg shaft 126d.

The first and second strut link rods 126e, 126f connect the intermediate shaft 126c to the main shaft 128.

More precisely, the first strut link rod 126e is connected, at one end, to the intermediate shaft 126c and, at its other opposite end, to the second strut link rod 126f via a second intermediate shaft 126g parallel with the intermediate shaft 126c and about which the strut link rods 126e, 126f are capable of pivoting.

The second strut link rod 126f is for its part connected by one end to the first strut link rod 126e via the shaft 126g and, by its opposite end, to the main shaft 129 as can be seen more clearly in FIG. 4.

The two strut connecting rods 126a, 126b and the two strut link rods 126e, 126f make it possible to articulate the strut 126 so that it can be positioned substantially horizontally inside the landing-gear housing 120 when the landing gear is folded.

A strut counter-locking cylinder 130 is placed behind the second strut link rod 126f and is used to stabilize the strut 126 in position and, more particularly, to protect the second strut link rod 126f.

The landing gear 120 is retracted by the rotation of the main shaft 128 on itself, bringing with it the strut 126 of which the connecting rods and link rods 126a, 126b, 126e, 126f are articulated relative to one another by pivoting about their respective axes and fold more or less toward one another.

In its movement, the strut 126 in its turn drives the leg 124 which is then brought inside the landing-gear housing 111 in order to be stowed therein in the position that can be seen in FIGS. 5 and 6.

The rotation of the main shaft 128 is actuated, unlike with the landing gears of the prior art, not by a single cylinder connected to the roof of the landing-gear housing, but by two cylinders 132 placed on a device for mechanical connection and transfer of forces that will be described below.

By virtue of this arrangement, it is possible to spread the power necessary for rotating the main shaft 128 to the two cylinders and not just one. The spatial arrangement of the two cylinders on the device makes it possible notably to save space inside the housing.

Moreover, the dissymmetrical deformations are limited relative to a configuration with a single cylinder.

It will be noted that the movement to deploy the landing gear is carried out in reverse manner.

A device for mechanical connection and transfer of forces 140 according to the invention and the manner in which it interacts with the frames of the front structure 100, the landing-gear housing 111 and the landing gear 120 will now be described with reference to FIGS. 4, 5 and 6.

In the embodiment shown in these figures, the device for mechanical connection 140 comprises a rod assembly 142 comprising a pair of connecting rods 144 and a pair of associated clevises 146. The fact that the connecting rods and the clevises are present in pairs is the result of a desire to protect the mechanism. However, only one connecting rod and only one clevis may be envisaged. Conversely, the device for mechanical connection 140 may comprise more than two pairs of connecting rod and clevis, or even more than two elements per pair of each.

The connecting rods 144 are, at their first end, attached to the main shaft 128 and, at their opposite end, to the stay shaft 129.

Their direction of extension, shown by the axis A-A in FIG. 6, is in particular normal to the plane containing the second oblique frame 106.

The two clevises 146 are situated on either side of the stay shaft 129 and each comprise two holes, a hole 146a and a lower hole 146b.

Each upper hole 146a is designed to receive the stay shaft 129 while each lower orifice 146b is designed to receive a shaft not shown that is mounted on one of the bearings 106d (FIG. 3) in order to attach the clevis 146 to the second frame 106.

For this, the length of the clevis is adapted to the height of the aperture 106c of the second frame 106.

FIG. 7 is used to illustrate the functions and the advantages of the elements described above by showing by arrows the forces induced by the wheels 124 of the landing gear 120 on the leg 122 and the strut 126 when the aircraft is running.

During running, the wheels 124 sustain forces 150*a* and 150*b* that are directly transmitted to the leg 122 of the landing gear 120. The leg 122 then transmits one portion of these forces to the main shaft 128 and another portion to the strut 126.

The strut 126 for its part transmits through its link rods 126*e*, 126*f*, forces to the main shaft 128 and, through its connecting rods 126*a*, 126*b*, forces to the stay shaft 129.

The resultant forces 152*a* and 152*b* transmitted to the main shaft 128 are directly transmitted, via the rear braces 113*a* of the reinforcing elements 113 of the housing 111, to the partition wall 105*b* which, in its turn, transmits them to the skin of the front structure of the fuselage 100.

The stay shaft 129 for its part sustains the forces 153 transmitted by the strut 126.

By virtue of the device for mechanical connection and transfer of forces 140, a portion of the forces 153 is transferred to the second frame 106 by means of the clevises 146. The frame 106 thus absorbs the portion 154*a* of the forces 153.

The rest of the forces 153 (which constitute the majority of the forces coming from the strut), the forces 154*b*, are transferred by means of the two connecting rods 144 of the device 140 to the main shaft 128 which transmits them in its turn to the skin of the fuselage via the mechanical path described above.

Thus, the role of the connecting rods 144 is to produce a closed path between the strut 126 and the gear leg 122 so as to transfer the forces induced by the landing gear 120 to the second frame 106 and to the first frame 105.

This transfer of force is made particularly effective by the fact that the second frame 106 and the connecting rods 144 are perpendicular because any force component along the axis X is thus eliminated.

Thus, by virtue of the device for mechanical connection and transfer of forces 140, the partition wall 105*b* absorbs the majority of the forces induced by the landing gear 120. Specifically, the partition wall 105*b* is particularly strong and transmits the forces in the most direct manner to the skin of the front structure 100.

It is therefore not necessary to provide reinforced side walls for the landing-gear housing 111, which provides a substantial saving in space and weight.

Moreover, the integration of the landing gear 120 into the front structure 100 is carried out more simply than in the prior art because it requires only the attachment of the main shaft 128 and stay shaft 129 to the structure. The number of adjustments necessary for the integration is thereby considerably reduced.

Figure 8:
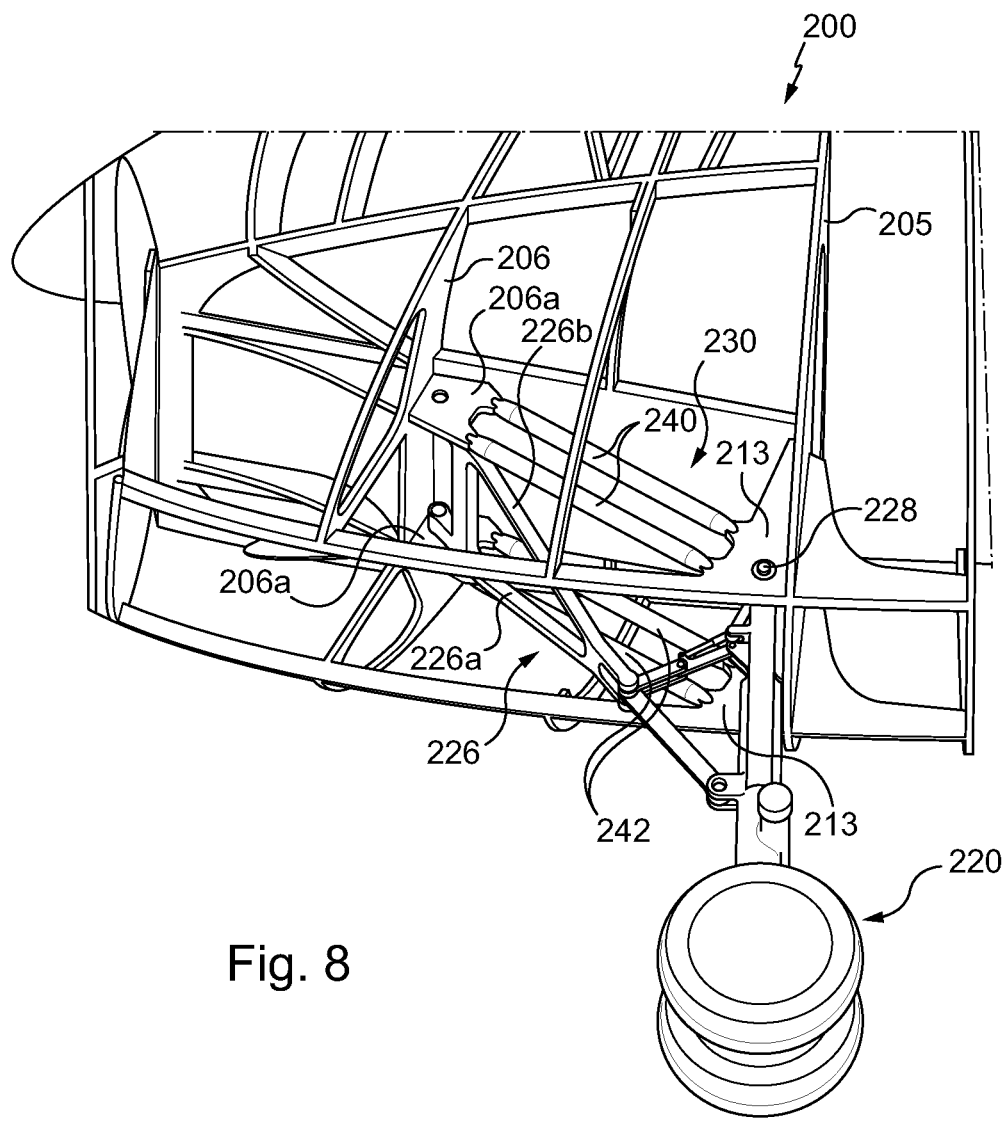
FIG. 8 is a schematic representation in perspective of a front structure of an aircraft in a second embodiment of the invention.

A second embodiment of a front structure 200 according to the invention is shown in FIG. 8.

Because certain elements of this embodiment are common to those of the first embodiment, they will not be described again.

In this second embodiment, the front structure 200 comprises a first frame 205 that is not changed relative to the first frame 105. It also comprises a second frame 206 that is identical to the second frame 106 except that it has no central aperture 106*c* and that it comprises two parallel extensions 206*a* extending rearward perpendicularly to the plane of the second frame.

The landing gear 220, for its part, is different from the landing gear 120. The strut connecting rod 126*a* is replaced by a Y-shaped fork 226. The fork 226 comprises two branches 226*a*, 226*b*, which are connected to the second frame 206 by means of the two extensions 206*a* which support the stay shaft which is not shown for the purpose of clarity.

The front structure 200 comprises a device for mechanical connection and transfer of forces 230 which comprises two pairs of bars 240 and 242 that are parallel with one another, for example of circular section (other sections may however be envisaged). The number of four bars has been chosen so as to protect the mechanism. This number may however vary in other embodiments.

The four bars 240 and 242 are each connected by one of the two opposite ends to one of the two braces 213 (identical to the brace 113) attached to the first frame 205, and, by the opposite end, to one of the two extensions 206*a* of the intermediate frame 206.

The front ends of the bars 240 and 242 are inserted into the thickness of the extensions 206*a*, but other attachment means may however be envisaged.

The structure formed by the set of bars 240, 242 and the main shaft 228 and stay shaft 229 substantially forms a parallelogram which can deform. This deformation allows it to withstand the forces due to the pressure difference between the landing-gear zone and the adjacent pressurized zones of the aircraft.

The extension direction of the bars 240, 242, like that of the connecting rods 144, is perpendicular to the second frame 206. This embodiment therefore has the same advantages as the first embodiment in terms of transfer of forces.

Specifically, the forces induced by the landing gear 220 when running are transmitted via the simplest possible path to the first frame 205 and to the second frame 206 and notably by virtue of the oblique orientation of the second frame 206 which is perpendicular to the extension direction of the bars 240, 242.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A front structure of an aircraft fuselage, comprising landing gear capable of pivoting about two parallel pivoting shafts, a main shaft and a stay shaft in order to allow the deployment or the retraction of the gear, the landing gear comprising a leg supporting wheels that is connected to the main shaft and a strut connecting the leg to the stay shaft, wherein the front structure further comprises:

a first reinforcing frame and a second reinforcing frame, the main shaft and the stay shaft being respectively connected to the first and second frames, and a device for the mechanical connection and transfer of forces connecting the stay shaft and the main shaft and transferring to the main shaft a portion of the forces induced by the wheels of the landing gear onto the stay shaft, the second frame and said device being perpendicular to one another.

2. The front structure of an aircraft fuselage according to claim 1, wherein the front structure extends in a longitudinal direction, the first frame extending in a lateral cross section of the front structure perpendicular to the longitudinal direction and the second frame being inclined relative to this cross section.

3. The front structure of an aircraft fuselage according to claim 1, further comprising a landing-gear housing, a portion of the first frame of the front structure forming a rear wall of the landing-gear housing and the landing-gear housing comprising reinforcing elements resting on the rear wall and extending longitudinally toward the front of the housing following the local internal curvature of the fuselage.

4. The front structure of an aircraft fuselage according to claim 3, wherein the main shaft is attached to the reinforcing elements close to their bearing surface on the rear wall of the landing-gear housing.

5. The front structure of an aircraft fuselage according to claim 3, wherein the landing-gear housing comprises a roof having a convexity oriented toward the inside of the landing-gear housing.

6. The front structure of an aircraft fuselage according to claim 1, wherein the device for mechanical connection and transfer of forces comprises several mechanical connection members extending in an extension direction and connecting the main shaft to the stay shaft.

7. The front structure of an aircraft fuselage according to one claim 1, wherein the device for mechanical connection and transfer of forces comprises a rod assembly which comprises at least one connecting rod and at least one clevis.

8. The front structure of an aircraft fuselage according to claim 7, wherein said at least one connecting rod is connected, at one of its opposite ends, to the main shaft and, at its other end, to the stay shaft, the clevis directly connecting the stay shaft to the second frame of the front structure.

9. The front structure of an aircraft fuselage according to claim 7, wherein the rod assembly comprises two connecting rods and two devises associated respectively with the two connecting rods, the connecting rods being parallel with one another.

10. The front structure of an aircraft fuselage according to claim 7, wherein the landing gear also comprises at least one lifting cylinder placed on said at least one connecting rod of the rod assembly.

11. The front structure of an aircraft fuselage according to claims 9, wherein the landing gear comprises two lifting cylinders each placed on one of the two connecting rods of the rod assembly.

12. The front structure of an aircraft fuselage according to claim 1, wherein the mechanical connection members comprise at least two parallel bars directly connecting the first frame of the fuselage to the second frame of the fuselage, the main shaft having two opposite ends connected to the first frame, a first bar being arranged on the side of one of the two opposite ends of the main shaft and a second bar being arranged on the side of the other end of the main shaft, so that the bars, the main shaft and the stay shaft form a parallelogram.

13. The front structure of an aircraft fuselage according to claim 12, wherein the mechanical connection members also comprise a third bar and a fourth bar, the third bar being arranged beside the first bar and the fourth bar beside the second bar, all the bars being parallel with one another.

14. An aircraft comprising a front structure of an aircraft fuselage according to claim 1.

* * * * *